United States Patent
Zhang et al.

(10) Patent No.: US 10,395,397 B2
(45) Date of Patent: Aug. 27, 2019

(54) METAL ARTIFACTS REDUCTION FOR CONE BEAM CT

(71) Applicant: Carestream Health, Inc., Rochester, NY (US)

(72) Inventors: Jing Zhang, Shanghai (CN); Zhimin Huo, Pittsford, NY (US); Frank Zhao, Shanghai (CN)

(73) Assignee: Carestream Health, Inc., Rochester, NY (US)

(*) Notice: Subject to any disclaimer, the term of this patent is extended or adjusted under 35 U.S.C. 154(b) by 23 days.

(21) Appl. No.: 15/810,863

(22) Filed: Nov. 13, 2017

(65) Prior Publication Data

US 2018/0137658 A1    May 17, 2018

Related U.S. Application Data

(60) Provisional application No. 62/421,567, filed on Nov. 14, 2016.

(51) Int. Cl.
*G06K 9/00* (2006.01)
*G06T 11/00* (2006.01)
(Continued)

(52) U.S. Cl.
CPC ............ *G06T 11/008* (2013.01); *G06T 7/11* (2017.01); *G06T 7/13* (2017.01); *G06T 7/174* (2017.01);
(Continued)

(58) Field of Classification Search
CPC ... G06T 7/187; G06T 7/11; G06T 7/13; G06T 7/174; G06T 11/005; G06T 11/006;
(Continued)

(56) References Cited

U.S. PATENT DOCUMENTS

| | | | |
|---|---|---|---|
| 5,999,587 A | 12/1999 | Ning et al. | |
| 7,123,760 B2* | 10/2006 | Mullick | G06T 5/50 |
| | | | 382/131 |
| 9,934,597 B2* | 4/2018 | Schildkraut | G06T 11/005 |
| 2011/0081071 A1* | 4/2011 | Benson | G06T 11/005 |
| | | | 382/154 |

(Continued)

OTHER PUBLICATIONS

Zhang, Yongbin, et al. "Reducing metal artifacts in cone-beam CT images by preprocessing projection data." International Journal of Radiation Oncology* Biology* Physics 67.3 (2007): 924-932.*

(Continued)

*Primary Examiner* — Shefali D Goradia

(57) ABSTRACT

A method for processing volume image data obtains two-dimensional projection images of a subject on an image detector, wherein each of the images has the detector and a radiation source at a different scan angles. The image data is arranged as an image stack with corresponding pixel data from the detector in register for each of the images in the stack. A partial subset of projection images showing a metal object is identified. Information relative to the metal object propagates from the partial subset of projection images to the remaining images of the stack. For each of one or more stacked projection images, region growing defines a metal mask and adjusts image data values defined by the mask. The volume image data is reconstructed using region growing results. A 2D image is rendered and displayed from the reconstructed volume image data.

20 Claims, 16 Drawing Sheets

(51) Int. Cl.
  *G06T 7/11* (2017.01)
  *G06T 7/187* (2017.01)
  *G06T 7/174* (2017.01)
  *G06T 7/13* (2017.01)

(52) U.S. Cl.
  CPC ............ G06T 7/187 (2017.01); G06T 11/005 (2013.01); G06T 11/006 (2013.01); *G06T 2200/04* (2013.01); *G06T 2207/10081* (2013.01); *G06T 2207/20072* (2013.01); *G06T 2207/20156* (2013.01); *G06T 2211/421* (2013.01)

(58) Field of Classification Search
  CPC ......... G06T 11/008; G06T 2207/10081; G06T 2207/20072; G06T 2207/20156; G06T 2211/421
  See application file for complete search history.

(56) References Cited

U.S. PATENT DOCUMENTS

2011/0150307 A1* 6/2011 Souza .................... G06T 5/002
  382/131
2015/0178917 A1* 6/2015 Yang ..................... A61B 6/032
  382/131

OTHER PUBLICATIONS

A. X. Falcao et al., The Image Foresting Transform: Theory, Algorithms, and Applications, IEEE Transactions on Pattern Analysis and Machine Intelligence, vol. 26, No. 1, Jan. 2004, pp. 19-29.

W. A. Kalender et al., Reduction of CT Artifacts Caused by Metallic Implants, Radiology, vol. 164, No. 2, Aug. 1987, 2 pages.

L.A. Feldkamp et al., Practical cone-beam algorithm, J. Opt. Soc. Am. A/vol. 1, No. 6/Jun. 1984, pp. 612-619.

* cited by examiner

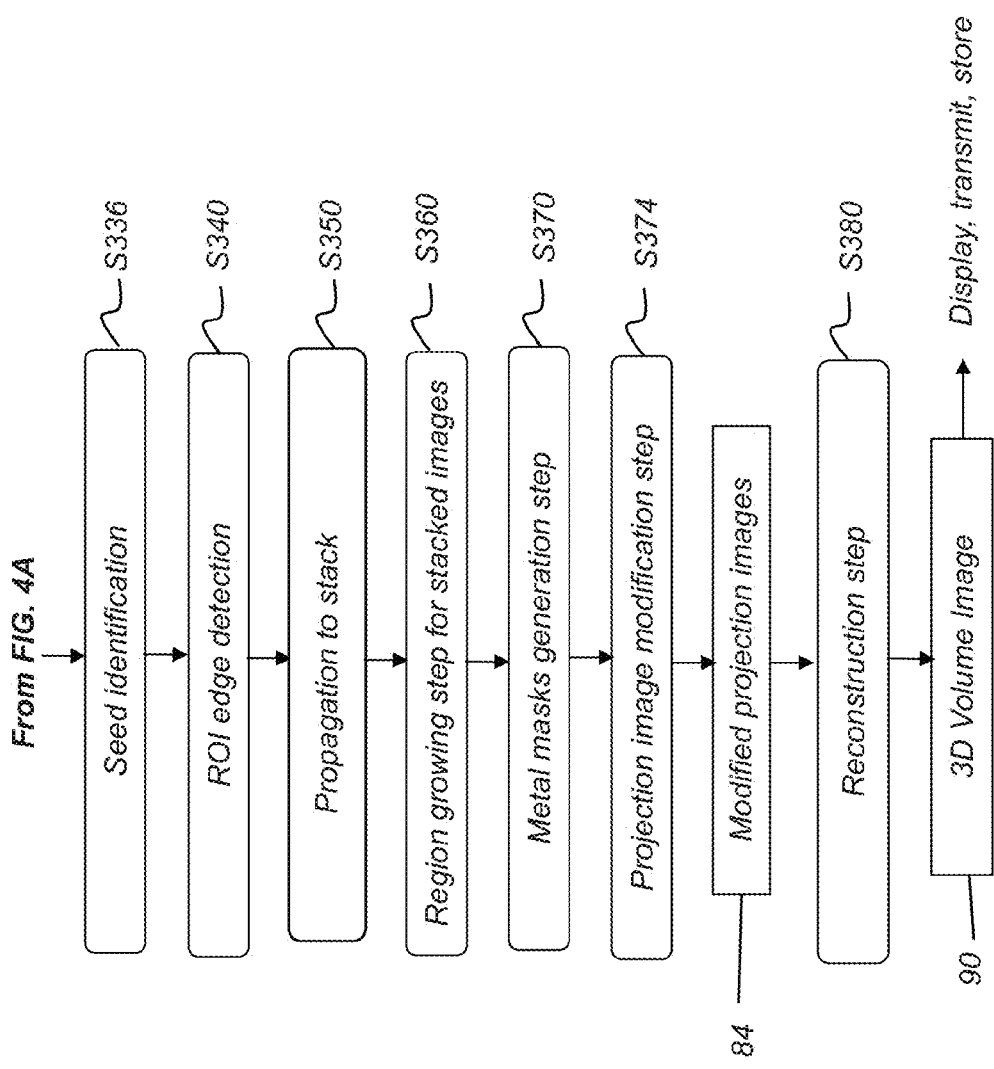

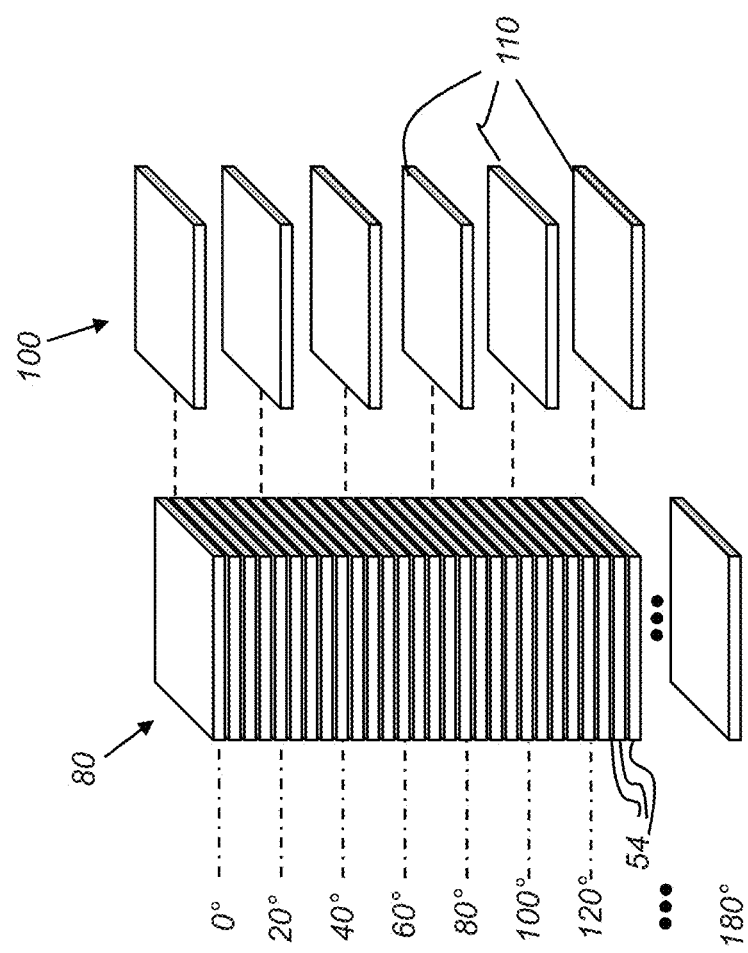

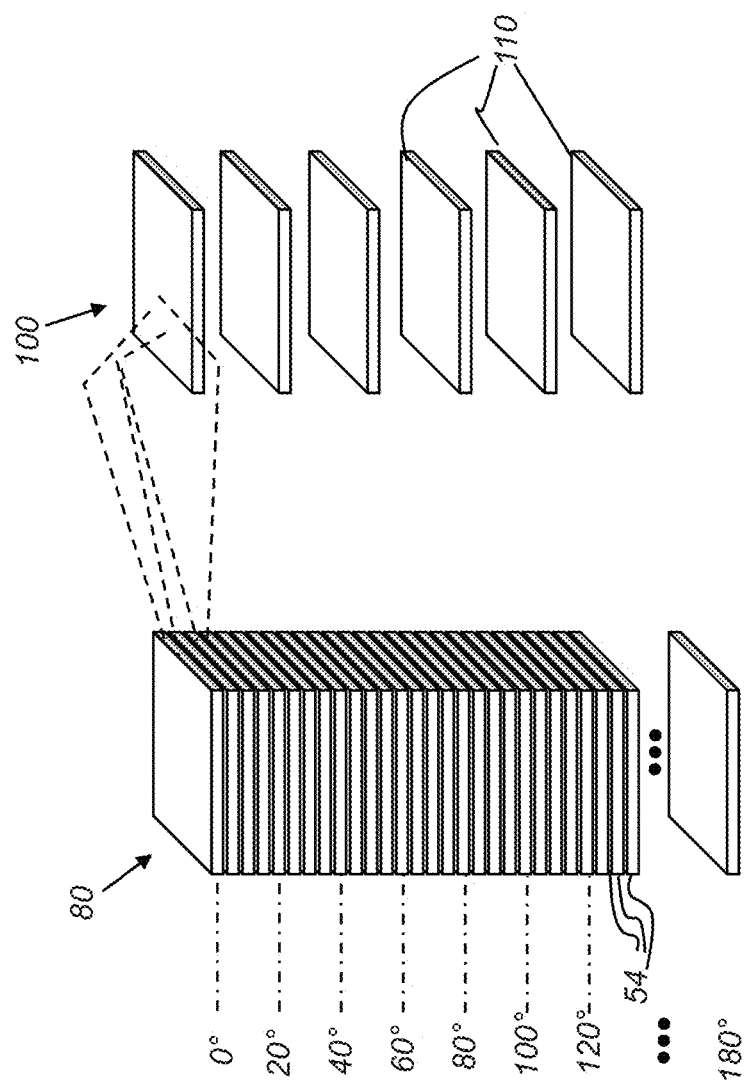

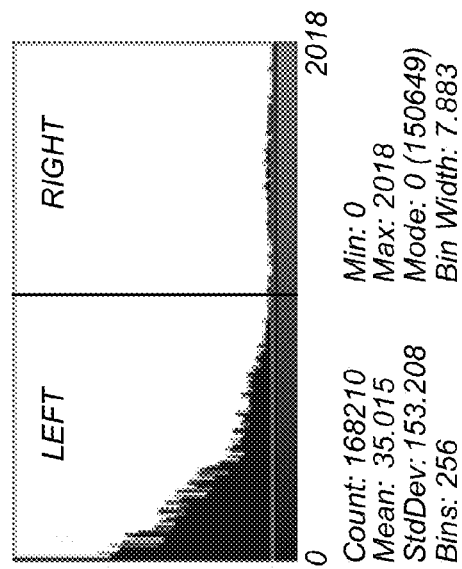
FIG. 6B
$$ConfidenceVal = \sum_{Max\,X/2}^{Max\,X} Y_i$$
FIG. 6C
FIG. 6A

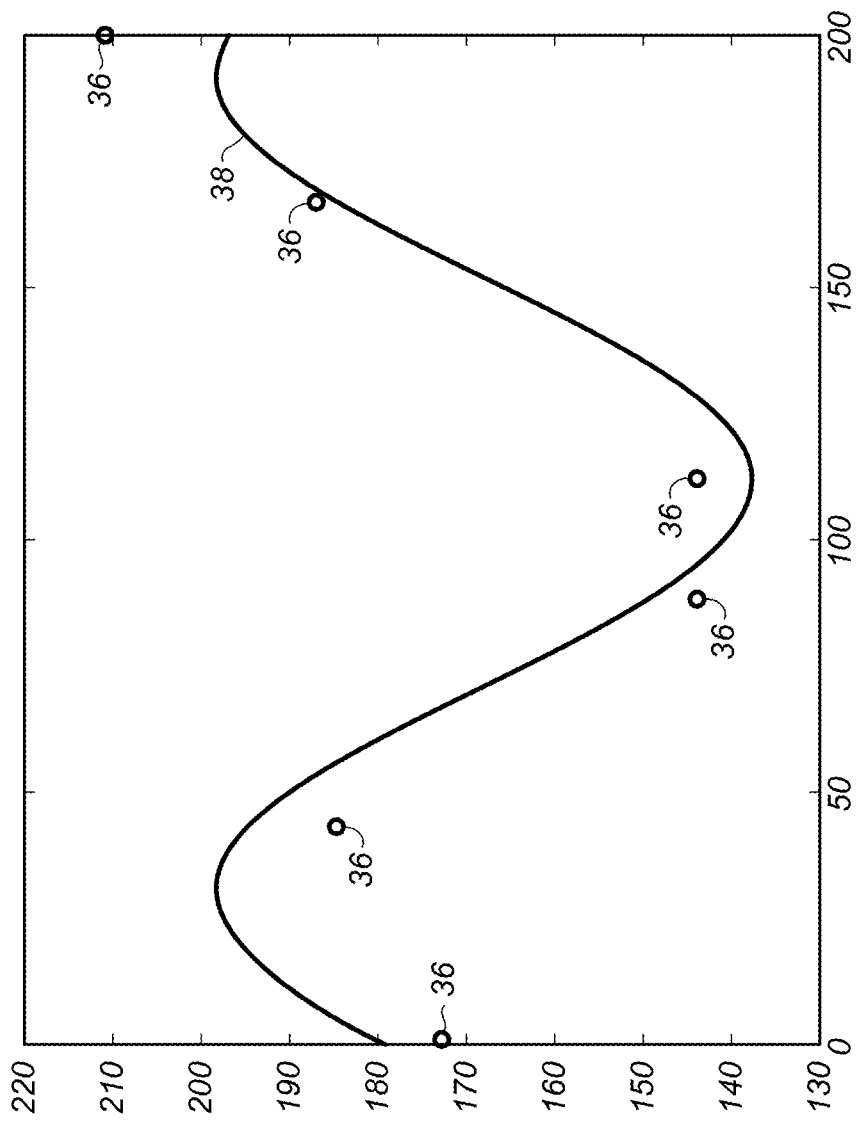

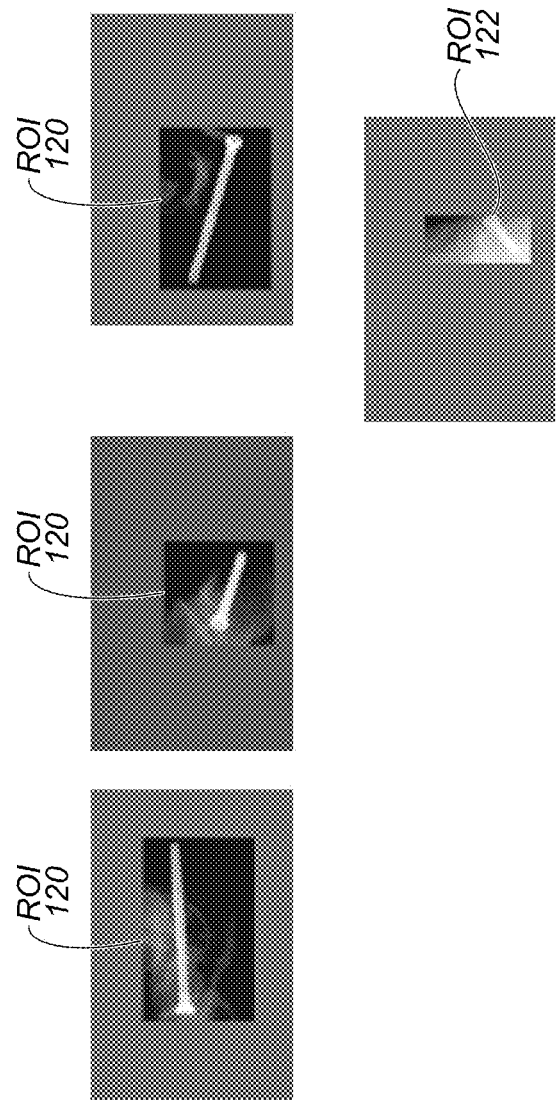

METAL ARTIFACTS REDUCTION FOR CONE BEAM CT

CROSS REFERENCE TO RELATED APPLICATIONS

This application claims the benefit of U.S. Provisional application U.S. Ser. No. 62/421,567, provisionally filed on Nov. 14, 2016, entitled "METAL ARTIFACTS REDUCTION FOR CONE BEAM CT", in the names of Zhang et al., incorporated herein in its entirety.

FIELD OF THE INVENTION

The invention relates generally to the field of diagnostic imaging and in particular to Cone-Beam Computed Tomography (CBCT) imaging. More specifically, the invention relates to a method for improving CBCT results using segmentation techniques to reduce metal artifacts in the reconstructed image.

BACKGROUND OF THE INVENTION 3D volume imaging is a diagnostic tool that offers significant advantages over earlier 2D radiographic imaging techniques for evaluating the condition of internal structures and organs. 3D imaging of a patient or other subject has been made possible by a number of advancements, including the development of high-speed imaging detectors, such as digital radiography (DR) detectors that enable multiple images to be taken in rapid succession.

Cone beam computed tomography (CBCT) or cone beam CT technology offers considerable promise as one type of diagnostic tool for providing 3D volume images. Cone beam CT systems capture volume data sets by using a high frame rate flat panel digital radiography (DR) detector and an x-ray source, typically affixed to a gantry that revolves about the object to be imaged, directing, from various points along its orbit around the subject, a divergent cone beam of x-rays toward the subject. The CBCT system captures projection images throughout the source-detector orbit, for example, with one 2D projection image at every degree increment of rotation. The projections are then reconstructed into a 3D volume image using various algorithmic techniques. Among the most common methods for reconstructing the 3D volume image are filtered back projection (FBP) approaches. An exemplary reconstruction approach is described, for example, in the paper by L. A. Feldkamp, L. C. Davis, and J. W. Kress, entitled "Practical cone-beam algorithm," *Journal of the Optical Society of America*, vol 1, pp. 612-619, June, 1984.

Although 3D images of diagnostic quality can be generated using CBCT systems and technology, a number of technical challenges remain. Highly dense objects, such as metallic implants, prostheses and related appliances, surgical clips and staples, dental fillings, and the like can cause various image artifacts that can obscure useful information about the imaged features. This occurs because dense objects having a high atomic number attenuate X-rays in the diagnostic energy range much more strongly than do soft tissue or bone features. When dense structures are in the exposure path, fewer photons reach the imaging detector through these objects. For 3D imaging, the image artifacts that can be generated in reconstruction routines by metallic and other highly dense objects include dark and bright streaks that spread across the entire reconstructed image. Such artifacts can be due to physical effects such as high quantum noise, radiation scatter, beam hardening, and non-linear amplification in reconstruction algorithms. These artifacts, generically referred to as metallic artifacts or metal artifacts, can reduce image quality by masking soft tissue structures, not only in the immediate vicinity of the dense object, but also throughout the entire image. Without some type of compensation, this can falsify CT values and even make it difficult or impossible to use the reconstructed image effectively in assessing patient condition or properly planning radiation therapy or other treatments.

Various approaches have been tried for metal artifacts reduction (MAR), with varying success and some shortcomings. Three types of approaches include:

1. Interpolation-based FBP reconstruction approach. This approach operates in the projection domain, where the metal feature or shadow is identified and obscured values are interpolated using nonmetal-contaminated neighbors. For some types of imaging, with a single metal object within a relatively homogeneous volume, this method works acceptably. However, in more complex heterogeneous tissue, particularly where there are multiple metal objects in a heterogeneous volume, the interpolation-based algorithm can make unrealistic assumptions about the volume segment that lies in the shadow of the feature or object(s), leading to prominent errors in the reconstructed images. Theoretically, it is known in the 3D imaging arts that any interpolation-based repair scheme of the Radon space is based on a weak underlying model. Hence, it cannot be expected that the estimated projection data will suitably fit the projection data if measured without metal objects.

2. Iterative reconstruction approach. Generally improved over the performance of interpolation-based FBP described in approach (1), the iterative reconstruction approach is also more successful for severely distorted images. Iterative reconstruction uses some prior knowledge of the image physics, noise properties, and imaging geometry of the system. For this method, it is necessary to have information about the shape and location and, possibly, the attenuation coefficients of the metal objects in the reconstruction image domain. Typically, a constrained optimization approach is applied, which can be very sensitive to system configurations and to the quality of the projection data. These requirements are easily met for computer simulation or phantom imaging, and have been experimentally tested by researchers; however, iterative reconstruction may be impractical for clinical use, where volume geometries are considerably more complex than those used in simulation. Furthermore, iterative reconstruction methods are computationally much more intensive than FBP, making these methods less practical for clinical use in commercial CT scanning apparatus.

3. Quasi-iterative based FBP approach. The quasi-iterative based FBP approach performs clustering in the reconstruction domain after the initial 3D image reconstruction, without any metal correction or with metal correction introduced in approach (1) (above). The voxel elements of the reconstructed volume are classified into several tissues, such as soft tissue, bone, air, etc., with each voxel assigned a value corresponding to one of these tissue types. This method then forward projects the classified reconstruction volume onto each metal-affected detector element and subsequently generates a final reconstruction of the thus modified raw data to obtain the metal artifacts reduced volume. This method outperforms the interpolation-based FBP approach. The most prominent feature of this method is suppression of secondary artifacts caused by the interpolation scheme. However, one drawback of this method is that it fails whenever the interpolation based approach (1) fails.

Moreover, quasi-iterative processing cannot handle the case where the object size exceeds the field of view, since additional artifacts caused by the forward projection are introduced in the corrected images.

An exemplary MAR approach is described, for example, by W. A. Kalender, R. Hebele, and J. Ebersberger, in an article entitled "Reduction of CT artifacts caused by metallic implants", *Radiology* 164(2), 576-577 (1987).

It is recognized that metal artifacts reduction is a challenging task, particularly where implant geometries may be more complex. There is a need for methods of metal artifacts reduction that offer performance and computational efficiency.

SUMMARY OF THE INVENTION

It is an object of the present invention to advance the art of volume imaging and provide improved ways to reduce metal artifacts in CBCT volume images.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for processing volume image data of a subject, the method executed at least in part on a computer and comprising: obtaining a first plurality of two-dimensional projection images of the subject on an image detector, wherein each of the images is obtained with the detector and a radiation source at a different scan angle relative to the subject; arranging the image data from the first plurality of two-dimensional radiographic projection images as an image stack so that corresponding pixel data from the detector is in register for each of the images in the image stack; identifying a partial subset of the plurality of two-dimensional projection images from within the stack, wherein each member of the partial subset shows a metal object; propagating detected information relative to the metal object from one or more members of the partial subject of projection images to one or more of the remaining two-dimensional projection images of the image stack; for each of one or more projection images in the stack: (i) performing region growing to define a metal mask for the metal object using the propagated information; (ii) adjusting image data values defined by the metal mask; reconstructing the volume image data using the region growing results; and rendering and displaying a 2D image from the reconstructed volume image data.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIGS. 4A and 4B show a logic flow diagram with a sequence for forming a volume image with reduced metal artifacts.

FIG. 5B shows selection of seed-generating projection images.

FIG. 5C shows propagation of seeds from the subset of seed-generating projection images.

FIG. 6A shows a pre-processed projection image.

FIG. 6B shows a histogram corresponding to confidence levels.

FIG. 6C is an equation for computing a confidence value.

FIG. 10B is a graph that shows actual vs. calculated values for center point location in successive projection images.

FIG. 10C shows a number of ROIs at different angles from image projections of a patient.

DETAILED DESCRIPTION OF THE INVENTION

Figure 1:
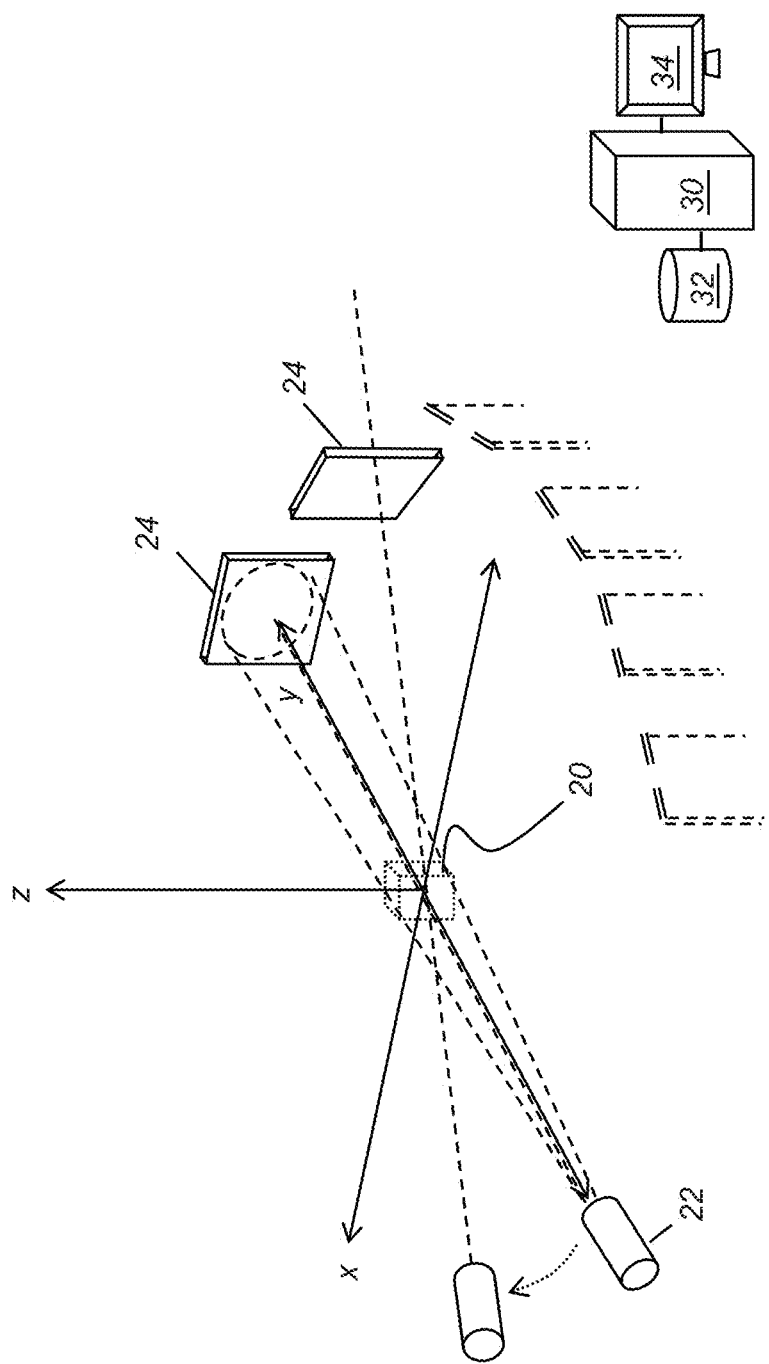
FIG. 1 is a block diagram schematic that shows how projection images are obtained.

The following is a detailed description of preferred embodiments of the invention, reference being made to the drawings in which the same reference numerals identify the same elements of structure in each of the several figures. In the drawings and text that follow, like components are designated with like reference numerals, and similar descriptions concerning components and arrangement or interaction of components already described are omitted. Where they are used, the terms "first", "second", "third", and so on, do not necessarily denote any ordinal or priority relation, but are simply used to more clearly distinguish one element from another.

In the context of the present disclosure, the term "volume image" is synonymous with the terms "3Dimensional image" or "3D image". Embodiments of the present disclosure are particularly well suited for suppressing the types of metal artifacts that occur in 3D volume images, including cone-beam computed tomography (CBCT) as well as fan-beam CT images. However, it should be noted that the artifacts reduction approach described herein is also applicable for 2D radiographic images, as described in more detail subsequently.

For the image processing steps described herein, the terms "pixels" and "pixel data" for picture image data elements, conventionally used with respect 2D imaging and image display, and "voxels" for volume image data elements, often used with respect to 3D imaging, can be used interchangeably. It should be noted that the 3D volume image is itself synthesized from image data obtained as pixels on a 2D sensor array and displays as a 2D image that is rendered from some angle of view. Thus, 2D image processing and image analysis techniques can be applied to the 3D volume image data. In the description that follows, techniques described as operating upon pixels may alternately be described as operating upon the 3D voxel data that is stored and represented in the form of 2D pixel data for display. In the same way, techniques that operate upon voxel data can also be described as operating upon pixels.

In the context of the present disclosure, high-density objects that cause what is commonly known as metal artifacts in the volume image are termed "metal" objects. This includes objects formed from materials having a relatively high mass attenuation coefficient. The mass attenuation coefficient for a material is not a fixed value, but varies, dependent, in part, on the photon energy level. An exemplary metal object of titanium, for example, has a mass attenuation coefficient of 4.972 cm$^2$/g at 30 keV and a mass attenuation coefficient of 0.4052 cm$^2$/g at 80 keV. Any object having attenuation at or near that of titanium or higher can be considered to be a metal object. It should be noted, for example, that objects formed from some types of highly dense composite materials can have a similar effect on image quality. The methods of the present disclosure address the type of artifact generated by such an object, of whatever material type or other composition. Materials commonly used and known to cause at least some type of "metal artifact" in radiographs and volume images include metals such as iron, cobalt, chromium, titanium, tantalum, and alloys including cobalt chromium alloys, for example, as well as some ceramic compositions and various composite materials such as high density composite plastics.

CBCT imaging apparatus and the imaging algorithms used to obtain 3D volume images using such systems are well known in the diagnostic imaging art and are, therefore, not described in detail in the present application. Some exemplary algorithms and approaches for forming 3D volume images from the source 2D projection images that are obtained in operation of the CBCT imaging apparatus can be found, for example, in the Feldkamp et al. paper noted previously and in the teachings of U.S. Pat. No. 5,999,587 entitled "Method of and System for Cone-Beam Tomography Reconstruction" to Ning et al. and of U.S. Pat. No. 5,270,926 entitled "Method and Apparatus for Reconstructing a Three-Dimensional Computerized Tomography (CT) Image of an Object from Incomplete Cone Beam Data" to Tam. Reference is also made to commonly assigned U.S. 2015/0178917 by Yang et al. All the mentioned references are incorporated herein by reference.

In typical applications, a computer or other type of dedicated logic processor for obtaining, processing, and storing image data is part of the CBCT system, along with one or more displays for viewing image results. A computer-accessible memory is also provided, which may be a memory storage device used for longer term storage, such as a device using magnetic, optical, or other data storage media. In addition, the computer-accessible memory can comprise an electronic memory such as a random access memory (RAM) that is used for shorter term storage, such as employed to store a computer program having instructions for controlling one or more computers to practice the method according to the present disclosure.

In order to more fully understand the methods of the present disclosure and the problems addressed, it is instructive to review principles and terminology used for CBCT image capture and reconstruction. Referring to the perspective view of FIG. 1, there is shown, in schematic form and using enlarged distances for clarity of description, the activity of a conventional CBCT imaging apparatus for obtaining the individual 2D images that are used to form a 3D volume image. A cone-beam radiation source 22 directs a cone of radiation toward a subject 20, such as a patient or other subject. A sequence of images is obtained in rapid succession at varying angles about the subject, such as one image at each 1-degree angle increment along a circular arc greater than 180 degrees. A DR detector 24 is moved to different imaging positions about subject 20 in concert with corresponding movement of radiation source 22. Each individual projection image is obtained in its respective XY plane, using Cartesian coordinate designations for the detector 24.

FIG. 1 shows a representative sampling of DR detector 24 positions to illustrate how the projection images are obtained relative to the position of subject 20. Once sufficient 2D projection images are captured in this sequence, a suitable reconstruction algorithm, such as filtered back projection (FBP), is used for generating the 3D volume image. Image acquisition and program execution are performed by a computer 30 or by a networked group of computers 30 that are in image data communication with DR detectors 24. Image processing and storage is performed using a computer-accessible memory 32. The generated 3D volume image can be presented on a display 34.

FBP is a discrete implementation of a simple analytic model that assumes that CT transmission measurements are linear functions of the attenuation line integrals along the corresponding primary photon trajectories through the subject and are noiseless. When scanning subjects comprised of only anatomically native materials under normal conditions, relatively simple corrections to the raw projection data are often sufficient to assure that these assumptions (e.g., linear relationship) are at least approximately valid. This treatment typically allows images that are free of visually observable artifacts. However, in regions shadowed by highly dense, attenuating objects such as metal, there can be a dramatic increase in noise and nonlinear detector response due to scatter and beam hardening. This gives rise to pronounced streaking artifacts. Mismatches between the simple FBP model of detector response and the physical process of signal acquisition when metal objects are in the scanning field of view are a significant source of those metal artifacts. An accurate physical model of the CT signal acquisition process is useful to mitigate the metal artifacts based on FBP reconstruction. Metal artifact effects can also result from other types of 3D volume image reconstruction, such as iterative reconstruction methods, for example.

Figure 2:
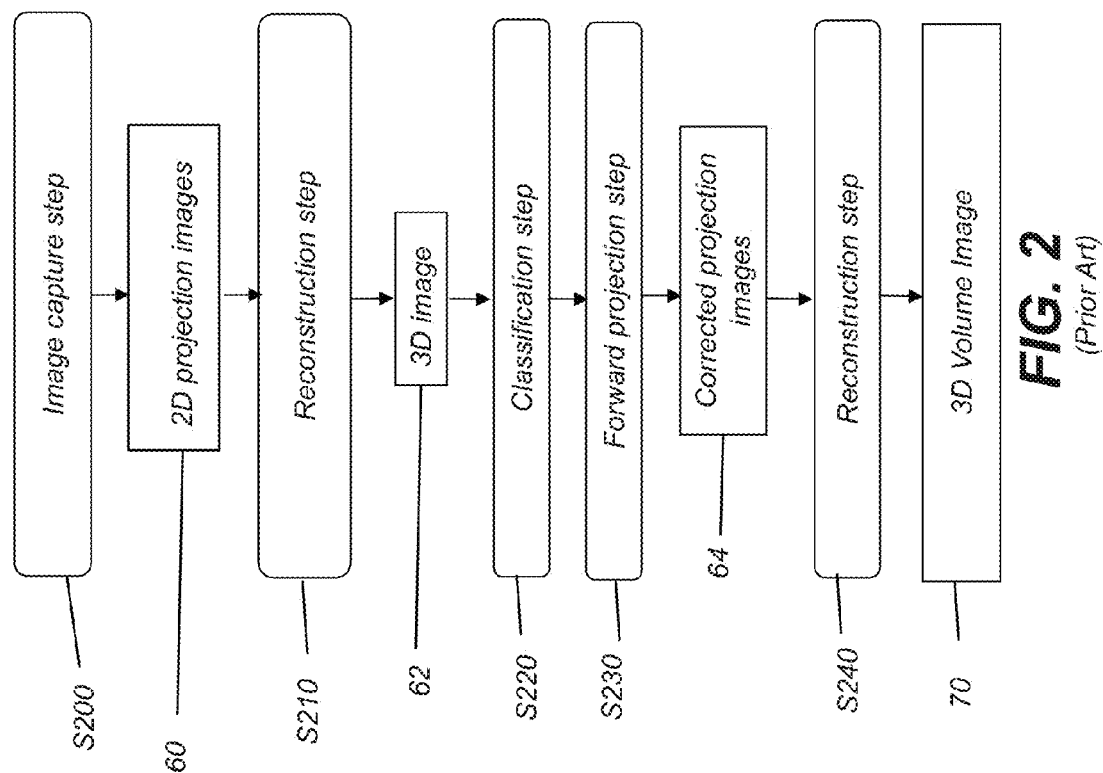
FIG. 2 is a logic flow diagram that shows a conventional sequence for metal artifacts reduction in volume reconstruction.

The logic flow diagram of FIG. 2 shows an image processing sequence that is conventionally used for metal artifacts reduction, as described previously in the background section. In an image acquisition step S200, a complete set of projection images 60 is obtained. Reconstruction, such as FBP reconstruction, is then used in a reconstruction step S210 to generate a 3D image 62. Then, a classification step S220 executes, classifying each voxel in the reconstruction as metal or bone/tissue. This information is used for forward projection in a forward projection step S230 to generate a corrected set of projection images 64. A second reconstruction step S240 executes, generating a 3D image 70 for display with reduced metal artifacts.

The method described with reference to FIG. 2 provides some amount of image correction. However, its repeated reconstruction processing is computer-intensive and can take a significant amount of time. Moreover, results of this processing can be disappointing and efforts to improve this process where metal artifacts are present have not yielded much improvement.

Figure 3B:
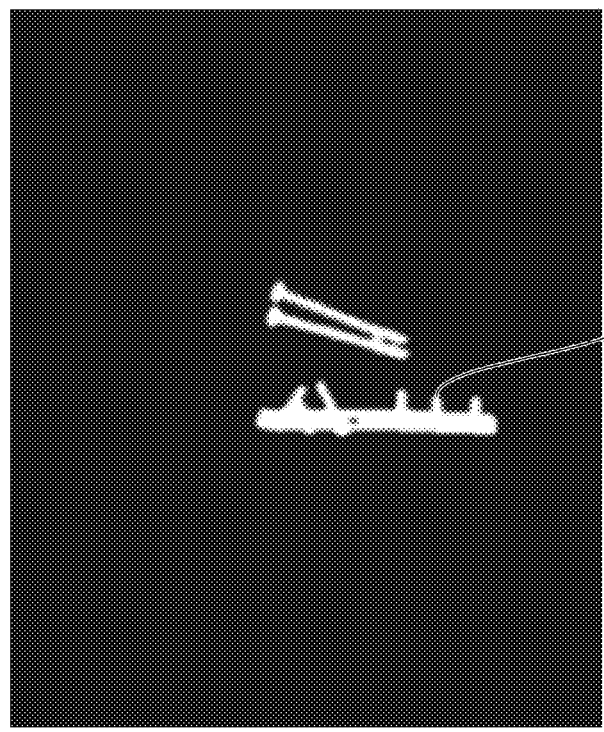
FIG. 3B is an example of a binary image mask for the image of FIG. 3A.
Figure 3A:
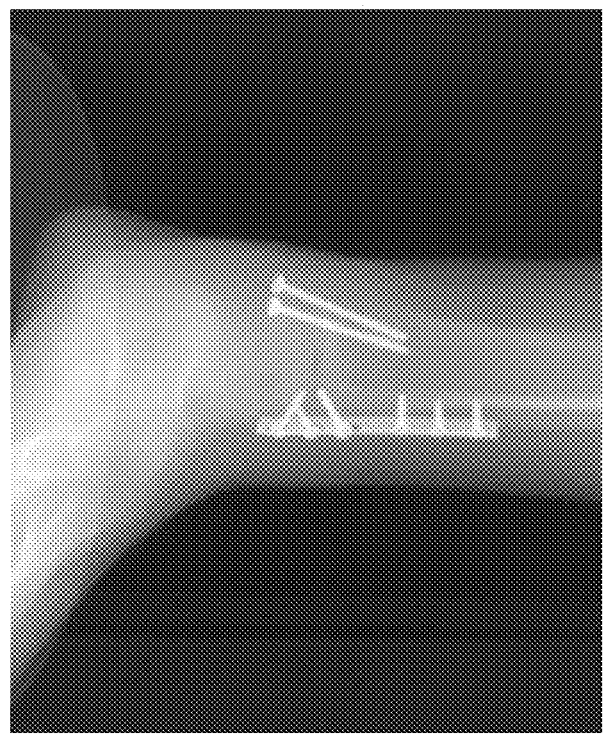
FIG. 3A shows an example of a projection image, wherein the imaged anatomy has metal components.

In view of what is needed for metal artifacts reduction, and to provide improved results and improved computational efficiency over conventional processing methods, the Applicants have used a different processing approach. One overall objective is to generate and provide an accurate metal mask for each projection image. FIG. 3A shows an example of a projection image, wherein the imaged anatomy has metal components. FIG. 3B is an example of a binary image mask 78 for the image of FIG. 3A. By using the mask of FIG. 3B, metal portions of the acquired image can be effectively identified, removed from the reconstruction processing, or provided with conditioned values for reducing artifacts in subsequent volume reconstruction.

Figure 4A:
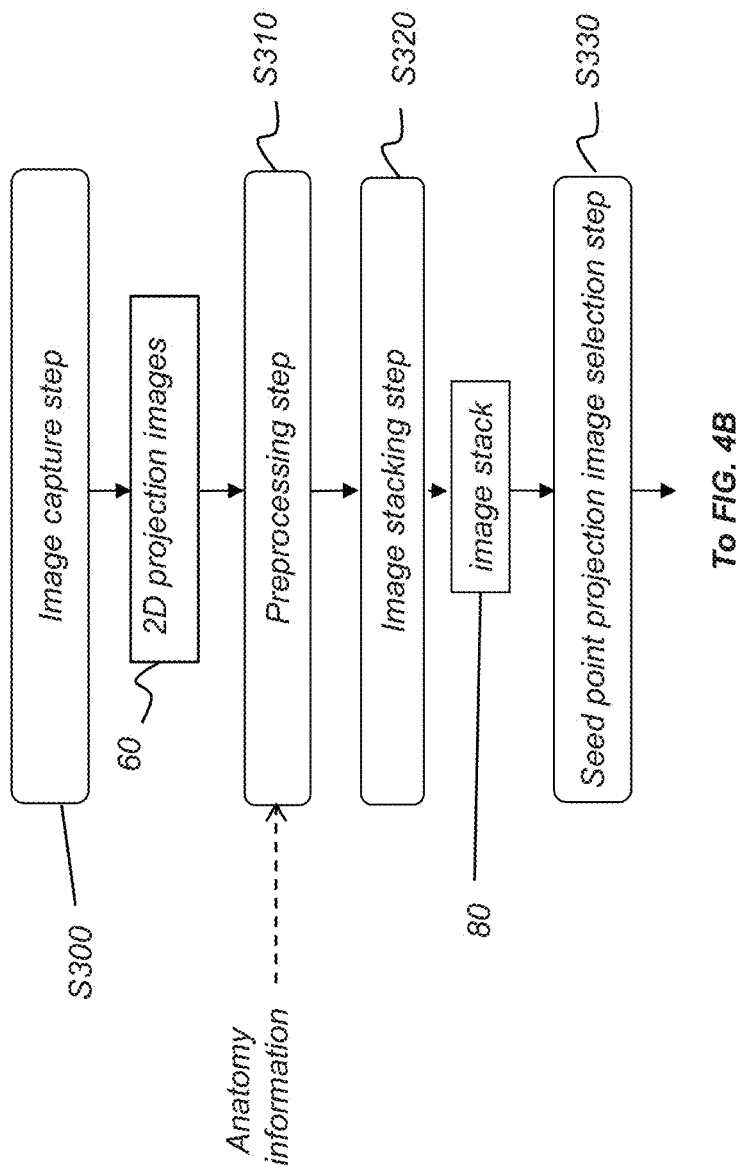

The logic flow diagram of FIGS. 4A and 4B shows an image processing sequence for 3D volume image reconstruction with compensation for metal artifacts according to an embodiment of the present disclosure. Subsequent FIGS. 5A-10C show details of various parts of the procedure described with reference to FIGS. 4A and 4B.

Beginning with FIG. 4A, in an image acquisition step S300, a complete set of M projection images 60 of the patient is obtained from the CBCT system, where M=200, for example. A preprocessing step S310 obtains anatomy information from the system, either using automatic methods for determining the body part, or from text or other data for the exam entered by the operator or practitioner. Preprocessing step S310 then performs other useful image processing on the M projection images 60, such as dynamic range expansion or compression, or other known preprocessing algorithms for projection image handling. The images can be processed to expand the dynamic range for improved detection, for example.

Stacking

Figure 5A:
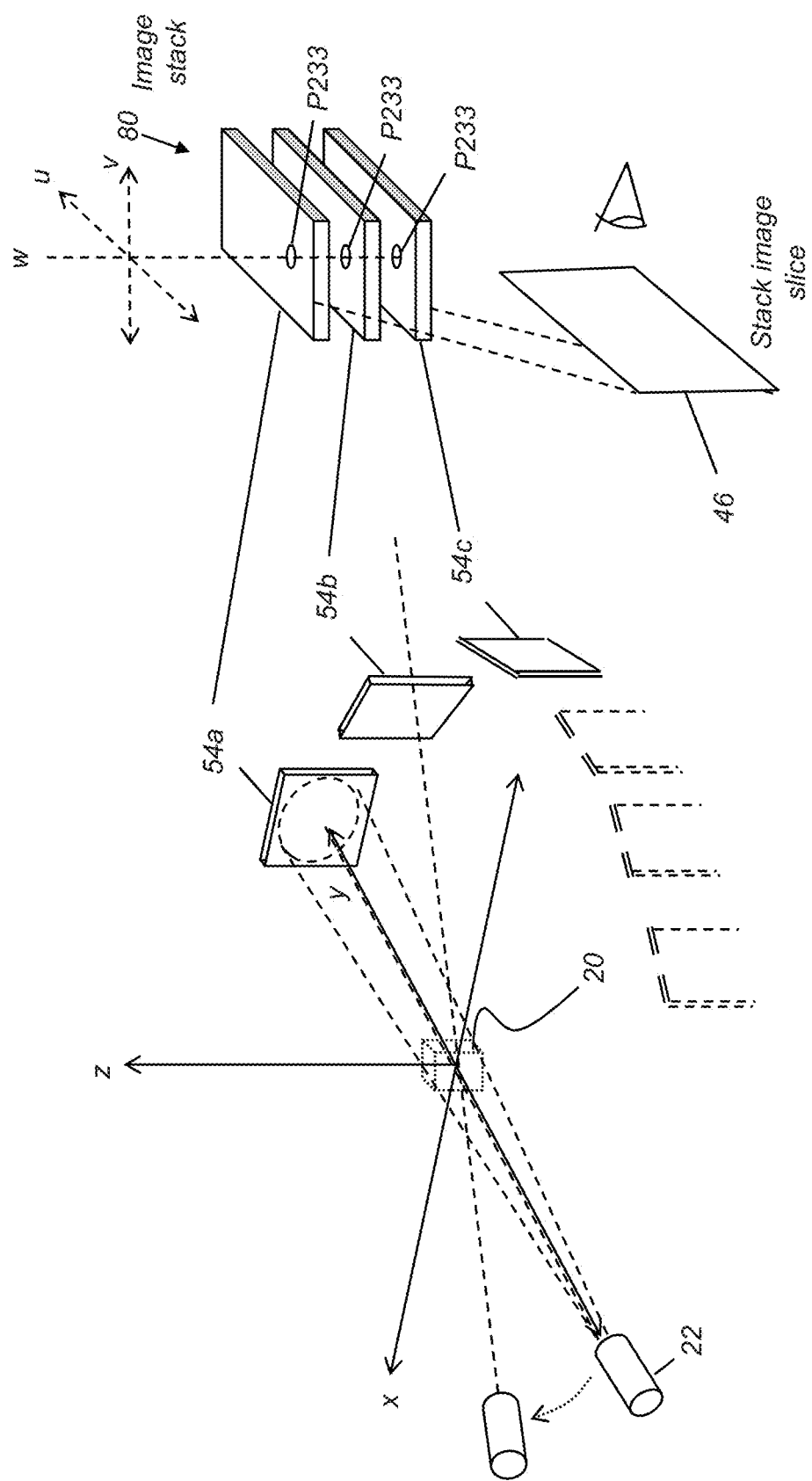
FIG. 5A shows image stacking for projection images.

Given the preprocessed members of the acquisition set of projection images, the process shown in FIG. 4A then executes a stacking step S320 to form an image stack 80. Image stack 80 provides a type of "pseudo-3D" volume by simply grouping all of the M projection images 60 as if lying against one another in a stacked arrangement. Considered from a side view, this stacking aligns the data in a sinogram arrangement. FIG. 5A represents, in schematic form, the stacked arrangement for region growing for inner pixels, that is, pixels within the metal object, in which corresponding pixels such as pixel P233 align against each other from one projection to the next.

In stacking step S320 of the FIG. 4A sequence, the projection images, each in its XZ or coronal plane at the angle of image capture on detector 24, as shown in FIG. 1, are stacked so that corresponding pixels within each image are in register. In this stacking, for example, pixels having the same coordinates are aligned in register with each other. The projection images from different angles or views are stacked in register, corresponding to each of the successive scanning view angles.

The stacking arrangement that is used processes image content from an angle that is orthogonal to the axis of the radiation beam. In practice, a few hundred projection images can be in an image stack 80. It must be emphasized that image stack 80 is not a reconstructed volume that is formed by processing the projection image pixels to provide voxel values; image stack 80 is simply a representative grouping of data formed by stacking successive images so that their respective pixels are in register. That is, corresponding pixel data from the detector 24 (FIG. 1) is in register for each of the projection images 54a, 54b, 54c, and so on, in the image stack. Relative to the image detector 24, the coordinates (u,v) for each pixel in the stacked projection images 54a, 54b, and 54c are aligned with each other in the image stack arrangement.

As shown in the FIG. 5A example, a representative pixel P233 on projection image 54a is in register with pixel P233 on projection images 54b and 54c. According to an embodiment of the present disclosure, slices 46 from this image stack are taken in a direction orthogonal to the uv plane that is shown and are viewed from along the v axis direction or parallel to the v axis direction. This process keeps track of the original (u,v) coordinates of each pixel as obtained by detector 24 so that the original projection image 54a, 54b, 54c, and so on, can be modified and used in subsequent reconstruction. It can also be appreciated that the slice that is processed can be in the uw plane or parallel to the uw plane, using the axis representation shown in FIG. 5A, or in some other plane that is orthogonal to the uv plane. The w axis in FIG. 5A represents the particular view angle of the originally obtained projection image, considered from the perspective of the radiation source 22. Multiple planes are processed so that each pixel in each projection image is processed in one of the image stack slices 46 that are taken from image stack 80. A single stack image slice 46 is represented in FIG. 5A as it would be viewed when considered apart from image stack 80. The term "stack image slice", numbered 46, is used herein to describe a 2D image slice that is obtained as an orthogonal slice from the assembled image stack 80. It can be appreciated that the two-dimensional stack image slice 46 has image pixel data from each of the first plurality of 2D projection images that were originally obtained. It should also be emphasized that stack image slice 46, an arrangement of pixels taken from image stack 80, is a different type of image slice than the 2D image slice that is rendered from voxels of the reconstructed volume.

Identifying a Partial Subset of High-Confidence Images for Metal Content

Continuing with the sequence of FIG. 4A, a seed point projection image selection step S330 identifies a subset of the projection images that are used to identify inner and outer seeds for subsequent region growing within each projection image or from one image to the next. The images that are selected for this subset are shown schematically in FIG. 5B as seed-generating projection images 110, members of a high-confidence subset 100. In practice, as shown in FIG. 5B, it is useful to have projection images 110 in high-confidence subset 100 distributed at intervals throughout the stack 80. This allows these images to be more easily related to the other stacked images at similar rotation angles, as described subsequently.

Selection of projection images 110 for subset 100 from the larger stack 80 is based on clear indication from the projection image data that an imaged object is metal. Determining the suitability of the projection image 110 data to be used for seed selection can be performed in a number of ways.

For seed point projection image selection step S330 of FIG. 4A, a confidence curve can be generated for each of the M projections. By way of example, FIG. 6A shows a pre-processed x-ray projection image; FIG. 6B shows its corresponding histogram. In an embodiment, the confidence curve is simply based on the histogram distribution, so that the groupings of values above and below a threshold value are indicators of the overall suitability of seed values from a particular projection image. Grayscale values are represented along the x-axis. In the particular example of FIGS. 6A and 6B, the bulk of histogram values represent non metal regions, with values well below a midway or ½ maximum point value (with the midway point between values 0 and 2018). Values above the midway point indicate high-density content, such as metal objects. The histogram formed in this way provides a useful utility for quantifying the likelihood of a metal object in each projection image.

In member images of the high-confidence subset of the projection images, each member of the subset shows a metal object or metal feature at high contrast. The N images used for seed point selection can be interspersed at equal increments, if possible, spaced apart between an equal number of intervening stacked projection images in the ordered sequence of projection images, such as every 25 or 30 images, for example.

The equation shown in FIG. 6C shows how a confidence value can be computed in a straightforward manner, using the total number of pixel values larger than the midway or ½ maximum grayscale value in a projection image. Variable Yi indicates the number of occurrences at a particular grayscale value, as shown in the histogram of FIG. 6B. The value ConfidenceVal provides a measure of contrast and characterizes the shape of the histogram, which indicates difference in contrast between metal and non metal regions. Histogram values shown in the graph of FIG. 6B are based on computations shown in FIG. 6C.

Figure 7C:
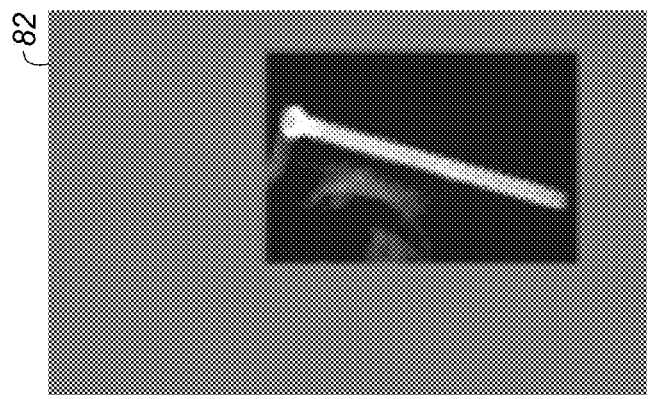
FIG. 7C shows an ROI from a projection image.
Figure 7B:
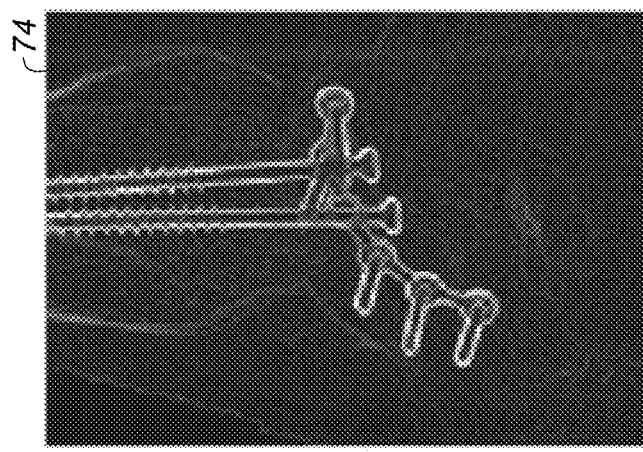
FIG. 7B shows metal edges detected from a projection image.
Figure 7A:
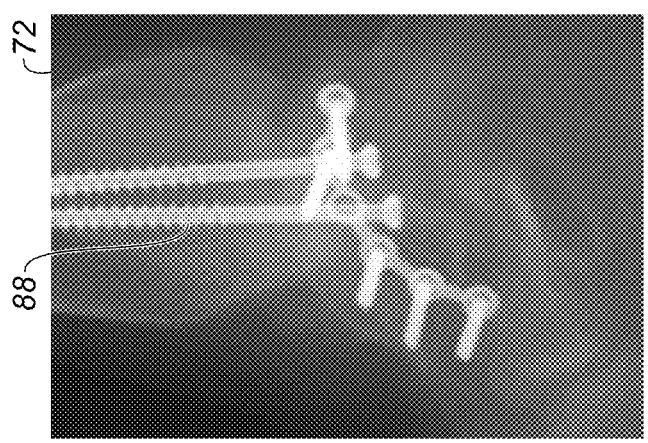
FIG. 7A shows a metal object from a projection image.

Features that can also be evaluated for high confidence in selecting the partial subset of N seed point projection images can be any of the following, as shown in the examples of FIGS. 7A, 7B, and 7C:

(i) a metal feature, as in FIG. 7A, such as a fastener or other object that is clearly formed of a sufficiently dense material, as shown in an image 72 that has a metal object 88;

(ii) one or more distinct metal edges that indicate an edge of a metal object as in FIG. 7B that shows image 74; or (iii) a region of interest (ROI) that is determined to contain a metal object as shown in FIG. 7C as ROI image 82; typically the ROI is larger than the metal object.

Figure 7D:
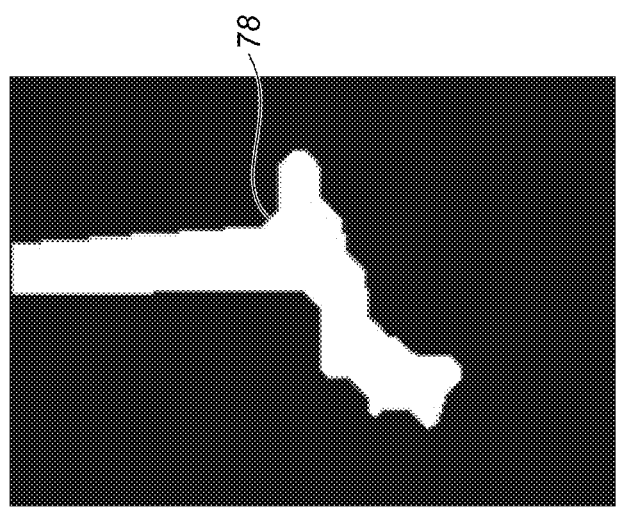
FIG. 7D shows a mask generated for the metal object of FIG. 7A.

FIG. 7D shows a corresponding mask 78 generated from any of the feature types for a metal object listed above.

Figure 8:
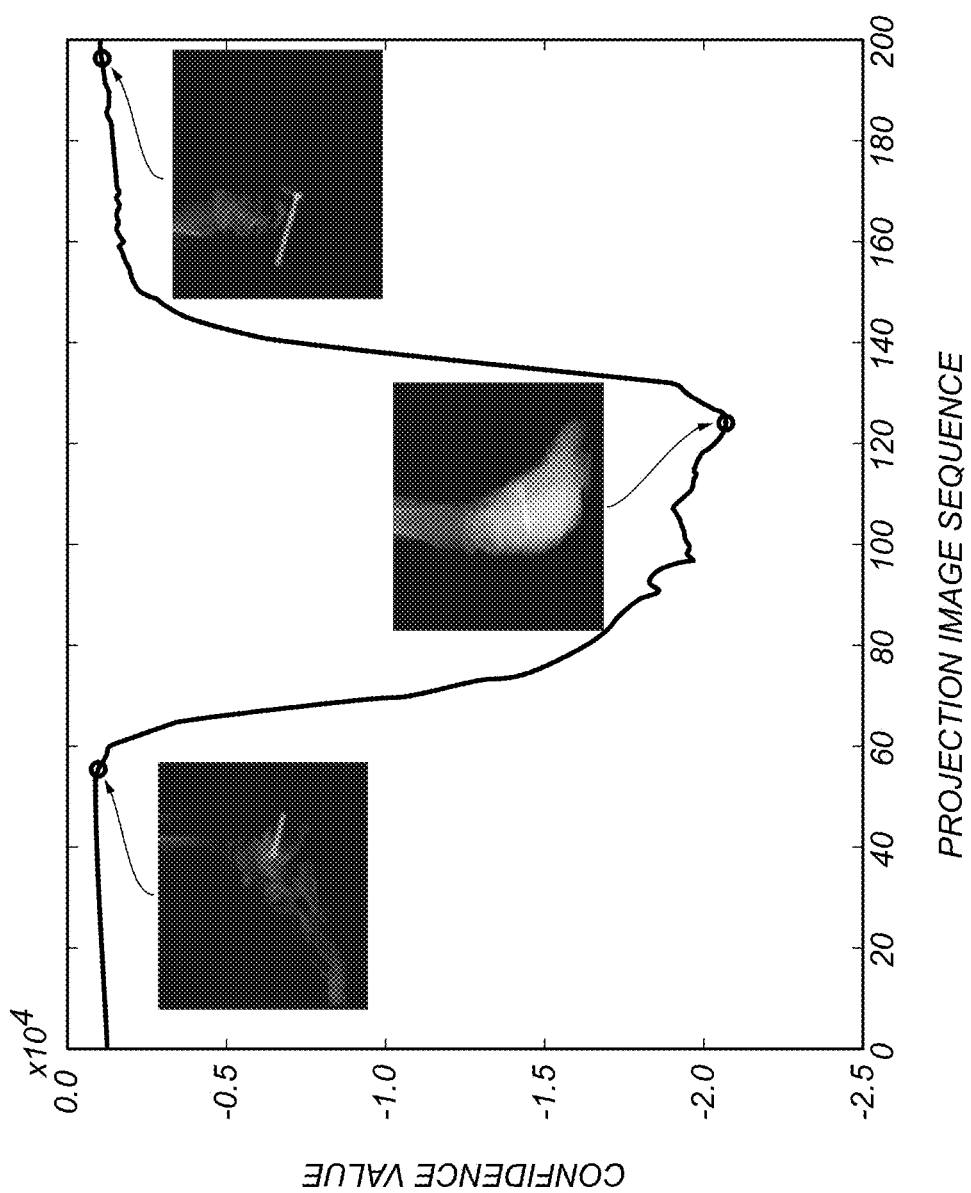
FIG. 8 shows a confidence curve generated for M=200 projection images according to an embodiment of the present disclosure.

FIG. 8 shows an exemplary confidence curve generated for M=200 projection images according to an embodiment of the present disclosure. The curve relates the relative confidence value for distinguishing foreground (metal) against background content for each image in the projection sequence, using values calculated as described with reference to FIG. 6C. The calculated confidence value is an indicator of relative confidence for metal detection, primarily based on object contrast. As can be seen, the middle image has significant bone content surrounding the metal feature, generating a low confidence value. Images on the right and left exhibit a high degree of contrast, with a relatively high confidence for metal object detection. Extreme points along transitions in the confidence curve are generally selected for providing the set of N projections with suitable seed points or ROIs for propagation and region growing, as described in more detail subsequently. As an alternate approach, seed points can be acquired from a representative set of N projection images that are spaced apart sufficiently from each other in the acquired sequence of projection images.

According to an embodiment of the present disclosure, a high confidence image can be identified as the image having a confidence metric such as ConfidenceVal in FIG. 6C that is highest within a set of ordered projection images. Thus, for example, one high-confidence image for high confidence subset 100 is selected from images 0 to 40, another from images 41 to 80, another from images 81 to 120, and so on.

Seed Identification

In a seed identification step S336 in FIG. 4B, a set of seed points are selected for subsequent propagation and processing. The set of seed points can be individual points represented by a small number of inside seeds (for seed pixels within well-defined metal regions) and outside seeds (for seed pixels outside the metal regions) selected for each of the selected seed generating projection images 110. Both pixel x,y coordinate position and data value of seed pixels can be identified and provided in order to propagate the seed value to the other images in the stack 80. Alternately, the set of seed points can form an ROI or mask feature that can be propagated from high confidence images to other stacked images, as described in more detail subsequently.

Figure 9:
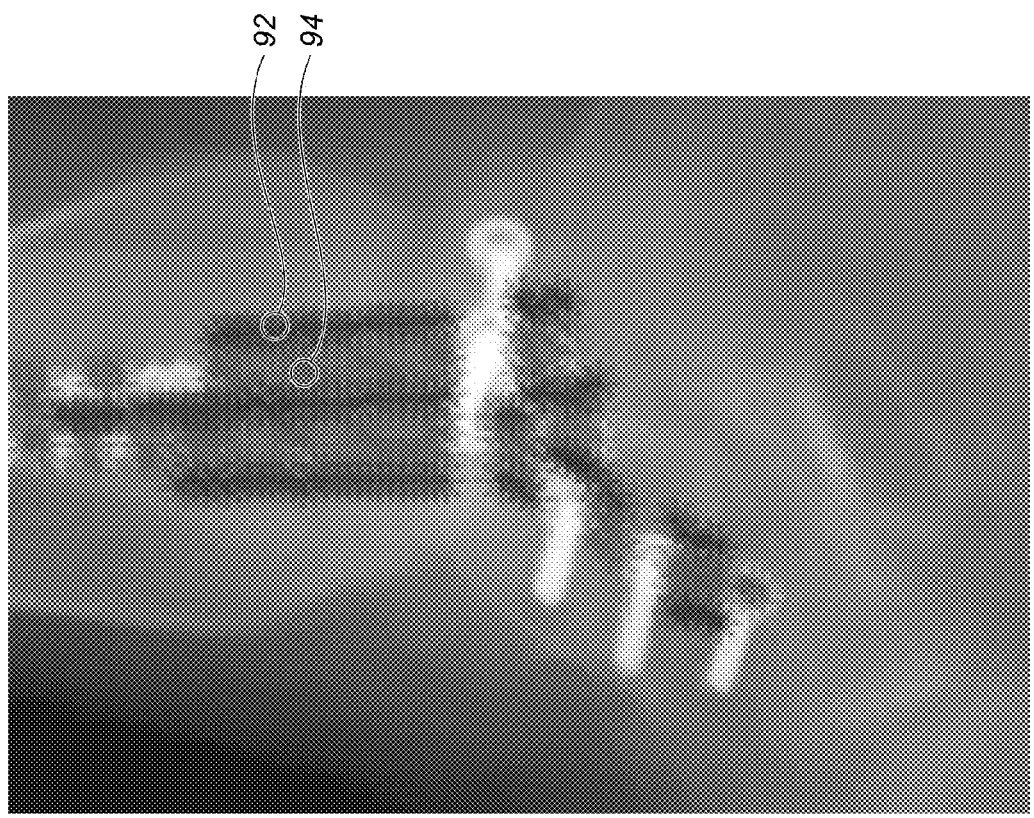
FIG. 9 shows selection of inner and outer seed points from a projection image.

Seed identification for metal and non-metal image components can be performed automatically, such as using data on material density or metal edges that are obtained from each image projection. Seed point selection can be done by analyzing projection image data, both horizontally and vertically.

Where edges have been distinctly defined with high confidence, seed identification can be fairly aggressive in selecting inner and outer seeds for the set of seed points relative to the defined edges of an ROI. Referring to FIG. 9, an inner seed point 94 is selected, just inside the ROI relative to the defined edge, using the edge detection image shown in FIG. 7B. An outer seed point 92 is identified, just outside of the ROI but close to the edge according to the edge detection image of FIG. 7B. Seed points can be identified for set membership using horizontal or vertical scans, for example.

Other features that can also be evaluated for high confidence in identifying potential seed points for membership in the set of seed points can include positively identified metal features, such as a fastener or other object that is clearly formed of a sufficiently dense material, as shown in an image 72 that has a metal object 88 as shown in FIG. 7A. A region of interest (ROI) that is determined to contain a metal object as shown in FIG. 7C as ROI image 82 can also be used for seed point identification; typically the ROI is larger than the metal object, and includes both inner seed points from within the object and outer seed points outside the object.

Figure 10A:
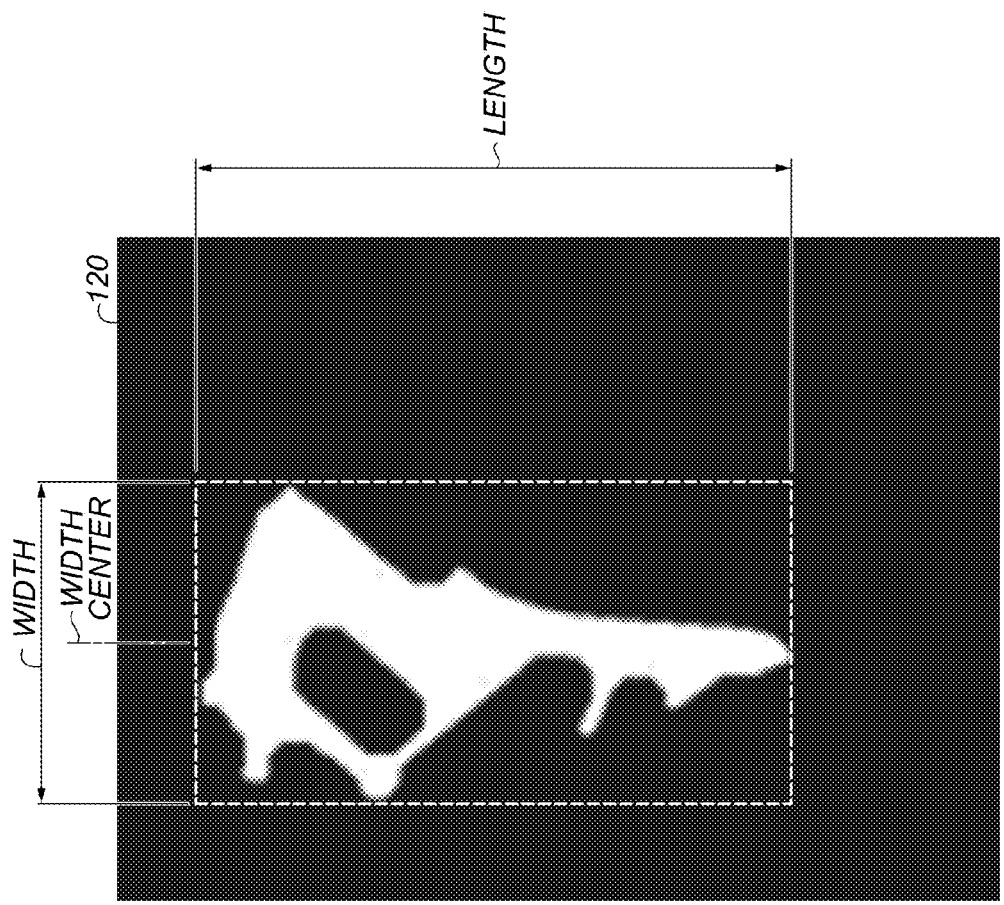
FIG. 10A shows an ROI for a metal object.

The confidence calculations performed in seed point projection image selection step S330 in FIG. 4A provide a useful input for an ROI edge detection step S340. High confidence curve values allow edge identification and inner/outer seed selection to be more aggressive, since edge transitions are likely to be more highly pronounced within the image at higher confidence levels. By way of example, FIG. 10A shows an ROI 120 for a typical metal component. Here, the ROI 120 is outlined in a dashed rectangle. Height and length dimensions are obtained and can be used to determine points such as center width for calculating ROI dimensions as the source and detector of the imaging apparatus revolve about the subject.

FIG. 10B is a graph showing the calculated and actual center locations of ROI 120 for stacked projection images. The vertical axis in the FIG. 10B graph relates to x-y position coordinates. The horizontal axis identifies the successive projection images, numbered from 0 to 200 in the example shown. Curve-fitting can be used to locate the ROI at different angular locations and as verification that the ROI is positively identified for subsequent images in the stack. Actual values 36 for different angular locations of the N high-confidence images are shown, fitted to a calculated curve 38. Curve fitting methods can be applied to identify ROI content in successive stacked projection images by plotting predicted values such as ROI width, ROI height, and ROI center for each projection image.

FIG. 10C shows ROIs 120 from high confidence projection images captured at different angular positions, such as those indicated at values 36 in FIG. 10B. A predicted ROI 122 shows an ROI calculated for a projection image from image stack 80 that is not considered a high-confidence image. Curve fitting is used for obtaining ROI 122, as described with respect to FIG. 10B. For identifying ROI 122, the center, width and height of ROI 120 from a high confidence image is obtained from fitted curves based actual values 36 calculated from the high confidence images.

ROI detection helps to provide a boundary that constrains subsequent growing procedure that defines object location within the stacked projection images.

Edge detection methods help to improve ROI detection, since edges provide well-defined boundaries that prevent overflow of region growth calculations from one type of structure to another, such as where a metal fastener is positioned near the edge of a bone feature. ROI edge detection step S340 (FIG. 4B) detects the ROI edges using any of a number of available image processing techniques adapted for identifying edge features or gradients indicative of edges of imaged structures.

The seed points, both inside and outside metal objects, can be points along the metal edges, or optionally generated metal masks or ROIs capturing the metal.

Propagation Step

A propagation step S350 then takes the results of seed point identification and ROI definition and optional mask generation for the ROI from steps S336 and S340, respectively, and propagates data related to the appropriate resulting features to the balance of (M-N) stacked projection images. The propagation process is straightforward: for the identified content of the set of seed points, either points (pixels), ROI, or optional mask, the system performs the following functions:

(i) calculate the expected location of the identified content in the stacked image, according to the incremental change in rotation relative to the corresponding high-confidence projection image that provides the point, ROI, or mask. The location can be identified using the center point location of an ROI or mask or a single seed point location, for example. Alternately, other points in the ROI or mask can be used as well as other seed structures, such as an ROI or mask itself, for example.

(ii) identify the corresponding content in the stacked image.

In some cases, the corresponding content in the stacked image (step (ii) above) may be difficult to identify with sufficient confidence. Where this occurs, propagation may be skipped for a particular projection image in the image stack 80 (FIG. 5B).

Propagation can work upwards or downwards in the stack. That is, referring back to FIG. 5C, numbering each of the stacked projection images from 1 to M in image stack 80, propagation from a member of the high confidence subset 100 can proceed through stack 80 in forward (+1) increments from 1 or backward (−1) decrements from M.

For seed propagation, the position and data values of the seed pixels can be propagated to the larger set of M projection images as values that can be used for the subsequent region-growing process used for generating metal masks for each of the M projection images in the stack. Similar features in the remainder of the M projection images can be identified and matched to the selected seeds for subsequent region growing. Both inner and outer seeds from the set of seed points can be propagated to the stacked images.

As an alternative to seed point propagation, the ROI or mask from a high-confidence image can be propagated to stacked images, effectively providing the seed point set. Thus, for example, ROI 120 from FIG. 10C can be propagated to stacked images in image stack 80 for identifying the corresponding ROI within each projection image. Similarly, where a mask has been generated, the mask can be propagated from projection images 110 within the high-confidence subset 100. ROI propagation can be particularly efficient and accurate, providing definition for subsequent region growth processing.

Depending on a confidence level for these seed points (inner or outer seed points), some propagate to all the M projection images, and some may propagate to only a portion of the projection images; still others may not propagate.

According to an embodiment of the present disclosure, prior knowledge of metal structures is used in edge analysis. Morphology data about a fastener, for example, allows calculation of fastener width at each angle in the selected set of high-confidence images N. Then, the fastener dimension and morphology information can be recomputed for interim angles between elements of the set of high-confidence images N.

Region Growing or Graphic-Based Segmentation Approach

Segmentation based on seed points can be performed within each projection image (2D region growing) or, alternately, within successive stacked projection images (3D region growing). Continuing with the sequence of FIG. 4B, a region growing step S360 then uses the inner and outer seed points propagated from the set of N images in high-confidence subset 100 and applies these data values within each of the N images for 2D region growing or graphic-based segmentation. Alternately, growth can operate by progressing to other M-N images in the stack 80 for 3D region growing.

Region-growing can thus be constrained within each projection image for 2D region growing or, alternately, can expand between stacked images for 3D region growing. Region growing methods identify the region that contains the metal object and then generate one or more metal masks for conditioning pixels that represent the object in order to compensate for metal artifacts.

Metal masks can be 2D or 3D masks, defining an area or region containing a radio-opaque object. In addition to working through each 2D projection image in planar fashion, the region growing logic can also take advantage of adjacent stacked elements, potentially allowing region-growing to move upward or downward (alternately considered, forward or backwards) through the stack.

With the images stacked in register, automatic 3D metal segmentation can be performed by considering successive sagittal stack image slices 46 through the stack. According to an embodiment of the present disclosure, segmentation is conducted in this image stack using an adapted execution of the Image Foresting Transform (IFT). The Image Foresting Transform takes advantage of the capability for expressing a multi-dimensional image as a set of nodes and arc-weights. This is described, for example, in detail in the article entitled "The Image Foresting Transform: Theory, Algorithm, and Applications," in *IEEE Trans on Pattern Analysis and Machine Intelligence*, 26 (1): 19-29, 2004, fully incorporated herein by reference. Using the alternate data representation employed by the IFT, substantial amounts of image data can be efficiently processed at high speed, using techniques familiar to those skilled in the image processing arts.

Region growing can use any of a number of suitable methods for data clustering and segmentation of image content. Among algorithms used for this purpose are watershed algorithm techniques, grow cut methods, IFT, and k-means techniques, for example.

Seed growth within each of the N selected projection images and, using propagated inner and outer seeds for the images in image stack 80, in each projection image in image stack 80 can be performed using any of a number of well known seed growth algorithms and tools, as described in more detail subsequently. Region-growing techniques and algorithms are well known to those skilled in the art, and serve to expand from the seed pixel out toward the boundaries of a metal/non-metal interface. These boundaries can be defined by ROI propagation and detection, for example.

Metal Mask Generation

Referring back to the sequence of FIG. 4B, using results from region growing step S360, a metal masks generation step S370 can be executed. In step S370, a metal mask can be generated for each of the M projection images, taking into account the relative view angle for each projection image. As part of view angle calculation and the shape of the mask, metal mask generation takes into account the changing position and width of a metal object as the scanner rotates through successive angular increments. For mask generation, a periodic function and successive curve fitting can be used to calculate width and position from the set of ROIs, using methods known to those skilled in the volume reconstruction arts. For a 3D mask, the generated volume defined by the 3D growing logic forms the mask.

Application of the metal masks to individual projection images is performed in a projection image modification step S374. Depending on the reconstruction method that is to be used, metal masks application may set all masked pixel values to a fixed value or may apply various types of digital filters or other techniques to compensate for the metal feature in subsequent reconstruction processing. This generates a modified set of projection images 84

Reconstruction

Reconstruction step S380 then forms a metal-compensated or -corrected 3D volume image 90 from the modified projection images 84 that have been adjusted to remove or otherwise condition the detected metal content to reduce or eliminate artifacts. The 3D volume image can then be used for generating rendered 2D display content, such as slices through the 3D volume, for example. In addition, the 3D volume, as well as any 2D rendering of the volume image data, can be transmitted or stored, such as for future display or display at a remote site, for example.

In addition, the metal masks generated in step S370 can also be used to generate volume 3D image 90 in reconstruction step S380.

Consistent with one embodiment of the present disclosure, the present disclosure utilizes a computer program with stored instructions that perform on image data accessed from an electronic memory. As can be appreciated by those skilled in the image processing arts, a computer program of an embodiment of the present disclosure can be utilized by a suitable, general-purpose computer system, such as a personal computer or workstation. However, many other types of computer systems can be used to execute the computer program of the present disclosure, including networked processors. The computer program for performing the method of the present disclosure may be stored in a computer readable storage medium. This medium may comprise, for example; magnetic storage media such as a magnetic disk such as a hard drive or removable device or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present disclosure may also be stored on computer readable storage medium that is connected to the image processor by way of the internet or other communication medium. Those skilled in the art will readily recognize that the equivalent of such a computer program product may also be constructed in hardware.

It should be noted that the term "memory", equivalent to "computer-accessible memory" in the context of the present disclosure, can refer to any type of temporary or more enduring data storage workspace used for storing and operating upon image data and accessible to a computer system, including a database, for example. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Displaying an image requires memory storage. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It will be understood that the computer program product of the present disclosure may make use of various image manipulation algorithms and processes that are well known. It will be further understood that the computer program product embodiment of the present disclosure may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present disclosure, are not specifically shown or described herein and may be selected from such algorithms, systems, hardware, components and elements known in the art.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for processing volume image data of a subject, the method executed at least in part on a computer, the method comprising the steps of:
   (a) obtaining a plurality of two-dimensional projection images of the subject, wherein each of the images is obtained using a detector and a radiation source at a different scan angle relative to the subject;

(b) arranging image data from the plurality of two-dimensional projection images as an image stack wherein corresponding pixel data from the detector is in register for each of the images in the image stack;

(c) identifying a subset of the plurality of two-dimensional projection images from within the image stack, wherein each image of the subset includes a metal object;

(d) propagating information relative to the metal object from at least one image of the subset to at least one image of the remaining two-dimensional projection images of the image stack;

(e) for at least one image in the image stack:
  (i) defining a metal mask for the metal object using the propagated information; and
  (ii) adjusting an image data value defined by the metal mask;

(f) reconstructing the volume image data in accordance with the adjusted image data value; and (g) rendering and displaying at least one two-dimensional image from the reconstructed volume image data.

2. The method of claim 1 wherein the step of obtaining the plurality of two-dimensional projection images is accomplished using a cone-beam computed tomography system.

3. The method of claim 1 wherein identifying the subset comprises computing a confidence metric for metal content.

4. The method of claim 1 further comprising:
detecting a region of interest from an image of the subset; and
generating a graph representative of at least one of center point location, width, and height of the region of interest for at least one of the remaining two-dimensional projection images of the image stack.

5. The method of claim 1 wherein step (e) further comprises performing region growing using a grow cut algorithm.

6. The method of claim 1 wherein step (e) further comprises performing region growing using an image foresting transform.

7. The method of claim 1 wherein step (e) further comprises performing region growing within the at least one image in the image stack.

8. The method of claim 1 wherein step (e) further comprises performing region growing between images in the image stack.

9. The method of claim 1 wherein propagating information comprises propagating one or more seed points.

10. The method of claim 1 wherein propagating information comprises propagating one or more regions of interest.

11. The method of claim 1 wherein propagating information comprises propagating one or more masks.

12. The method of claim 1 further comprising determining at least one high-confidence image which includes the metal object, and propagating information relative to the metal object from the at least one high-confidence image.

13. A method for processing volume image data of a subject, the method executed at least in part on a computer, comprising:
(a) obtaining a plurality of two-dimensional projection images of the subject, wherein each of the plurality of images is obtained with a detector and a radiation source at a different scan angle relative to the subject;
(b) arranging the image data of the plurality of two-dimensional projection images as an image stack so that corresponding pixel data from the detector is in register for each of the images in the image stack;
(c) identifying a subset of the plurality of two-dimensional projection images from within the image stack, wherein each image of the subset shows a metal feature;
(d) for at least one image in the image stack:
  (i) obtaining one or more seed values for the metal feature from an image of the subset;
  (ii) performing a region growing to define a metal mask for the metal feature using the one or more identified seed values; and
  (iii) adjusting image data values defined by the metal mask;
(e) reconstructing the volume image data in accordance with the adjusted image data values; and
(f) rendering and displaying at least one two-dimensional image from the reconstructed volume image data.

14. The method of claim 13 wherein obtaining one or more seed values further comprises identifying a pixel location.

15. The method of claim 13 further comprising performing the region growing within each image in the image stack.

16. The method of claim 13 wherein the region growing is accomplished by advancing from one image to another image in the image stack.

17. A method for processing volume image data of a subject, the method executed at least in part on a computer, comprising:
(a) obtaining a plurality of two-dimensional projection images of the subject, wherein each of the plurality of images is obtained with a detector and a radiation source at a different scan angle relative to the subject;
(b) arranging the image data from the plurality of two-dimensional projection images as an image stack so that corresponding pixel data from the detector is in register for each of the images in the image stack;
(c) for at least one image in the image stack:
  (i) identifying one or more edges that define a region of interest including a metal object within the image;
  (ii) segmenting the defined region of interest from surrounding tissue in the image;
  (iii) defining a metal mask according to the segmentation; and
  (iv) conditioning pixels in the image according to the defined metal mask;
(d) reconstructing the volume image data using the conditioned pixel image; and
(e) rendering and displaying at least one two-dimensional image from the reconstructed volume image data.

18. The method of claim 17 wherein reconstructing the volume image is accomplished using a filtered back projection.

19. The method of claim 17 wherein reconstructing the volume image is accomplished using an iterative reconstruction method.

20. A system for generating 3D volume data of a subject, comprising:
a radiographic imaging apparatus comprised of a radiation source and an imaging detector rotating about the subject to acquire a plurality of two-dimensional projection images; and
a processor in signal communication with the radiographic imaging apparatus and responsive to stored instructions for:

acquiring the plurality of projection images,
identifying one or more edges of a region of interest containing a metal object,
identifying at least one inner seed point within the region of interest and at least one outer seed point outside the region of interest,
defining the region of interest using a growth algorithm,
forming a mask corresponding to the metal object,
correcting at least one image according to the mask,
reconstructing a volume image according to the metal mask, and
rendering a 2D image to a display from the reconstructed volume image.

* * * * *